United States Patent [19]

Orlowski

[11] Patent Number: 5,335,921

[45] Date of Patent: Aug. 9, 1994

[54] BEARING ALIGNMENT DEVICE FOR PILLOW BLOCKS

[75] Inventor: David C. Orlowski, Milan, Ill.

[73] Assignee: Inpro Companies, Inc., Rock Island, Ill.

[21] Appl. No.: 4,973

[22] Filed: Jan. 15, 1993

[51] Int. Cl.⁵ .................... F16J 15/10; F16J 15/54
[52] U.S. Cl. ................... 277/30; 277/97; 277/178; 277/183
[58] Field of Search ............... 277/9, 11, 30, 47–49, 277/97, 100, 168, 178, 183; 384/489, 558

[56] References Cited

U.S. PATENT DOCUMENTS

| | | | |
|---|---|---|---|
| 2,702,729 | 2/1955 | Havens et al. | 384/489 |
| 2,983,529 | 5/1961 | Price | 277/178 X |
| 3,021,147 | 2/1962 | Haas et al. | 277/30 X |
| 3,776,559 | 12/1973 | Cawthorn | 277/178 X |
| 3,873,103 | 3/1975 | Derner | 277/178 X |
| 3,971,565 | 7/1976 | Schickling et al. | 277/178 X |
| 4,348,067 | 9/1982 | Tooley | 384/481 X |
| 4,533,264 | 8/1985 | Haugwitz | 384/472 |
| 4,840,385 | 6/1989 | Senft et al. | 384/489 X |
| 5,098,071 | 3/1992 | Umetsu | 277/30 X |

Primary Examiner—William A. Cuchlinski, Jr.
Assistant Examiner—Scott W. Cummings

[57] ABSTRACT

An improved alignment device and/or sealing device for creating an alignment of seals in split pillow block. An alignment device having a cylindrical member surrounding a shaft includes a plurality of sacrificial bearings fitted to the inside diameter of the carrier or alignment device and fixing the radial and angular position of the carrier and anything which is permanently attached to the carrier. This radial location of the carrier and/or elements attached thereto permits the seal, carrier, and housing to be self-aligned in conformance with the bearing, shaft, and housing. The axial positioning of the carrier and/or anything permanently attached thereto, with respect to the shaft, is accomplished by projections and resilient elements fitted between the housing and the alignment device of this invention. This invention permits the self-aligning of the bearing, the shaft, the seal, and alignment device to the housing. In the prior art, the shaft, along with the bearing automatically misaligned to the seal and the housing, there being no carrier and/or alignment device similar to this invention.

10 Claims, 2 Drawing Sheets

BEARING ALIGNMENT DEVICE FOR PILLOW BLOCKS

BACKGROUND OF THE INVENTION

Industry has long used self-contained bearing and housing units designed to support heavy rotating shafts. These bearing units require adequate lubrication for the bearings. The lubrication must be retained in the housing unit and in addition, contaminants such as debris, dirt, etc. must be kept out of the housing unit, out of the lubrication, and away from the bearing in order to ensure smooth operation. These self-contained units are commonly known as pillow blocks and/or plumber blocks. The types and sizes cover virtually all applications that employ the use of heavy, and sometimes long, shafts in equipment such as road building, conveyors, fans, etc.

In most cases, spherical roller bearings are employed in the housings or pillow blocks in order to accommodate angular and axial shaft displacement that results from loading and, in some cases, thermal growth of the shaft. The angular displacement of the shaft may also result when heavy radial loads are applied some axial distance from the bearing mounting position. In the normal pillow block, a small amount of angular misalignment to the shaft can be tolerated because of the spherical shape of the outside diametric surface of the bearing.

However, the seals associated with the pillow block have not been able to accommodate this angular displacement except by making the seal flexible and/or having a larger than desired amount of tolerance between the shaft and the sealing surface.

The normal, severe duty, pillow block is horizontally split, and the top half can be removed for convenient inspection and installation of the shaft, bearings, and seals. In the prior art, there have been many different systems for sealing split pillow blocks including lip seals, springs, V-rings, felt, grease pockets and relatively rotating rings forming a labyrinth seal sometimes called a disc pack.

These sealing devices and arrangements including combinations of the aforementioned systems have not been particularly successful because of misalignment between the seal and shaft. Constant maintenance and attention is required in order to ensure continued operation of the equipment (i.e. the shaft does not bind and/or seize).

All of the presently known means of sealing pillow blocks are ineffective because of the imperfect radial positioning of the sealing mechanisms or devices. The devices are ineffective and imperfectly positioned because of the non-concentricity of the housing and sealing mechanisms with respect to the bearing bore and shaft. All of the prior sealing mechanisms were affixed and positioned relative to the bearing housing and designed to permit or have a concentric offset to permit misalignment of the shaft with respect to the housing and/or the sealing device. The seals all were designed to accommodate the variance in the shaft angle, as noted before, either by making the contacting surfaces of material such as felt, etc. or having sufficient radial clearances between the sealing device and the housing to accommodate the variance in the angular displacement of the shaft.

SUMMARY OF THE INVENTION

These prior art sealing mechanisms did not perform adequately partly because of the variations in circumferential pressure and the resulting friction or disassociation on the sealing surface due to the misalignment of the shaft with respect to the housing and seal. The present invention circumvents and has none of the deficiencies of the known prior art sealing devices. This invention includes means for maintaining the sealing device radially aligned with the shaft and also for locating and maintaining the sealing device independent of the housing bore's outside diameter. This invention locates itself and the related sealing device perfectly along and aligned with the shaft both radially and axially so that it will follow any movements of the shaft and not be restricted by the housing attitude.

In accordance with the invention, there is provided a means in either the carrier for the sealing device or, in the event of a unified carrier and sealing device, the sealing device itself for radially positioning the carrier and/or the sealing device with respect to the shaft. This arrangement or innovation utilizes temporary bearing surfaces, sometimes called a skate, fitted tightly to the shaft for proper positioning of carrier or seal with respect to the shaft. Upon the rotation of the shaft, a portion of this bearing surface is worn away or sublimated to permit free rotation of the shaft but the remaining surface remains in close proximity to the shaft. In addition, the axial displacement from the bearing of the carrier and/or seal device is accomplished by the utilization of resilient members fitted on a radially projected member and fitting in and filling at least one of the pre-formed grooves of the split housing. When the two parts of the split housing are tightened securely to each other, this innovation not only provides a fixed axial position and fixed radial alignment for the seal, but also permits misalignment of the housing with respect to the carrier and/or sealing device and the shaft.

The advantages of this invention are that the carrier and/or sealing device is always aligned both radially and axially with the shaft, thereby making any seal a more efficient barrier to the movement of the lubrication inside the housing and of the contamination outside the housing.

DETAILED DESCRIPTION OF A PREFERRED EMBODIMENT OF THE INVENTION

Figure 1:
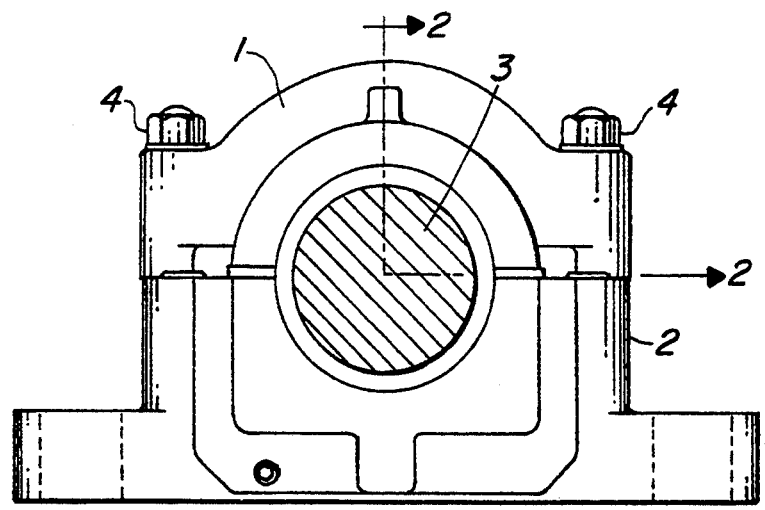
FIG. 1 is an end view of the normal pillow block or self-contained bearing unit.
Figure 2:
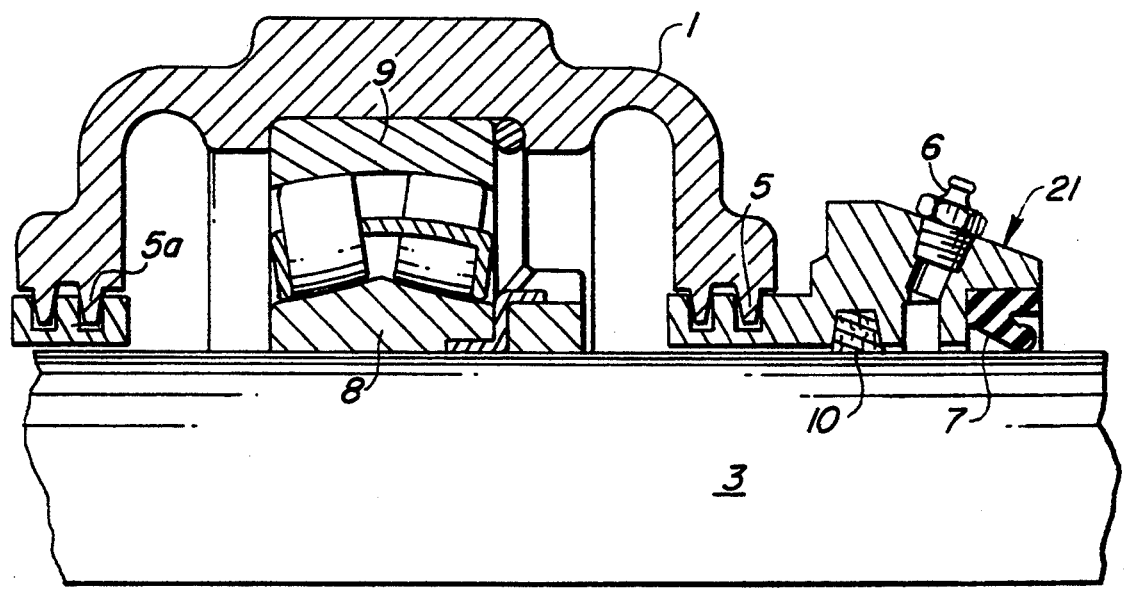
FIG. 2 is a side view of one-half or the upper portion of the pillow block of FIG. 1 and showing a plurality of prior art sealing devices thereon.

FIG. 1 shows the end view of a normal pillow block including the housing parts 1 and 2, the shaft 3, and the bolts 4 used to tighten and secure housing parts 1 and 2 to each other. FIGS. 1 and 2 will be used to describe the prior art. FIG. 2 shows the housing 1 of a normal pillow block and illustrates the grooves and mating surfaces 5 shown on the right-hand side. The mating grooves 5 in the housing 1 and 2 would be normally used with various sealing devices shown assembled in sequence from left to right in the seal carrier 21, i.e. felt 10, Zirk fittings and grease seal 6, and the flexible rubber seal 7; all used for sealing the inside of the housing from the outside environment along the shaft 3. On the left side of the housing 1 and 2, the grooves 5(a) are illustrated which would also act as seals when the upper and lower parts of the pillow block are secured together forming, with the normal inserts, the typical loose-fitting labyrinth seal arrangement for use with pillow blocks. FIG. 2 illustrates the normal curved bearing of pillow blocks with raceways 8 and 9 having controlled curvature to provide freedom of angular alignment of shaft 3. However, in practice, the housings 1 and 2 and sealing devices were almost always misaligned to some magnatude to the shaft and bearing.

Figure 3:
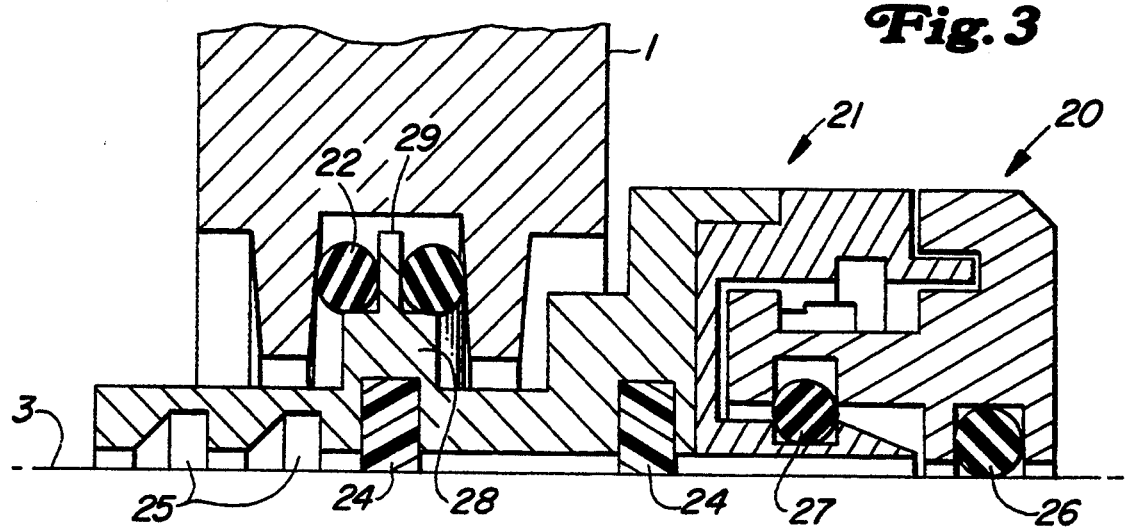
FIG. 3 is a side view of the invention showing a sealing device and/or the seal carrier surrounding the shaft and affixed to the housing of the pillow block, aligned with the shaft.

Referring to FIG. 3, a portion of the housing, inside elevation, a seal mechanism 20, and the novel seal carrier and alignment mechanism 21, are shown as utilized in applicant's invention. The sealing device 20 is of any desired type but is shown as a sealing device, substantially as described in co-pending U.S. patent application Ser. No. 07/962946, wherein the rotor and stator of the seal are locked together to prevent axial movement of the sealing device 20.

The novel alignment mechanism 21 of this invention may be separate from seal 20 as shown or may be made integral with the seal if desired without affecting the function. The sealing device 20, as shown, comprises the rotor 20(a) and stator 20(b), axially held together by the O-ring 27. The rotor drive O-ring 26 also serves as a seal.

The novel improvements provided by the carrier and/or sealing devices of this invention are the alignment of the sealing device 20 and the carrier 21 radially and also with respect to the axial center line of the shaft 3. The carrier 21 ans seal 20 are axially fixed to a predetermined location on the shaft 3. The carrier and/or sealing device 20 and 21 is placed in position normally in the bottom half, not shown, of the housing which is a mirror image of that shown in FIGS. 3, 4, and 5. The novel aligning and positioning elements 24, which are normally made of Teflon ® or some other similarly sublimable or erodible sacrificial material, are then firmly abutted to the shaft 3. The carrier or aligning portion 21 includes projections 28 and 29 which fit into a groove 30 found in the split housings 1 of pillow blocks. The O-rings 22 are made of a deformable material and are securely fitted into the groove 30 and held in an axial position by the projections 28 and 29 and are held in position radially and distorted angular position by the natural force of the resilience of the O-rings 22.

Figure 5:
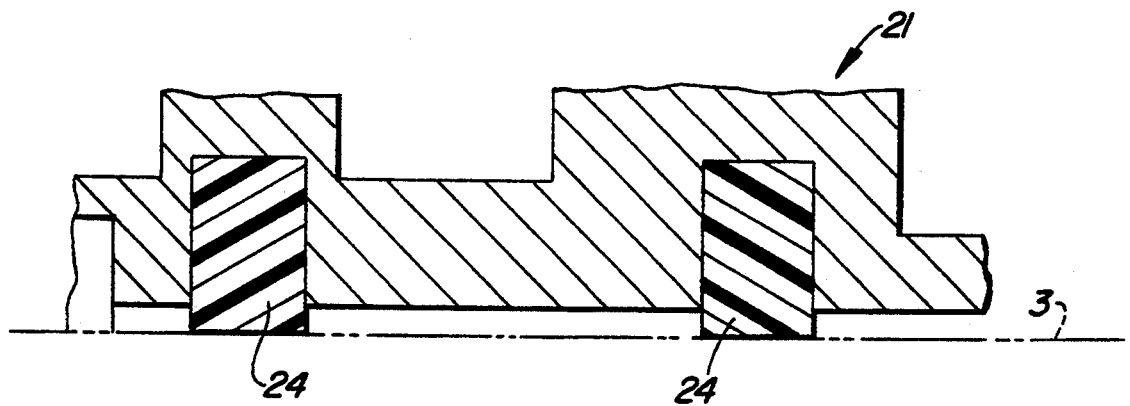
FIG. 5 is a detailed view of the novel elements for radially fixing the carrier and/or seal of the invention.

In operation, after the novel alignment carrier 21 and/or seal 20 of this invention are inserted onto the shaft 3 and fitted into corresponding grooves 30 in the bottom half of housing 1, the top half of the housing 1 of the pillow block is placed into position and secured by bolts 4 to the bottom half, not shown. The radial alignment and positioning members 24, normally a material having a low co-efficient of friction, are now firmly abutted to the shaft 3 as shown in FIG. 5.

The radial alignment and positioning members 24 are sacrificed by being slightly worn away or sublimated when the shaft 3 is rotated. Thus, radial alignment is maintained because the wearing action ceases as soon as there is zero contact between the elements 24 and shaft 3. The seal 20, whether integral with alignment member 21 or affixed thereto is now permanently aligned with the shaft and bearings (not shown in FIGS. 3, 4, and 5).

Figure 4:
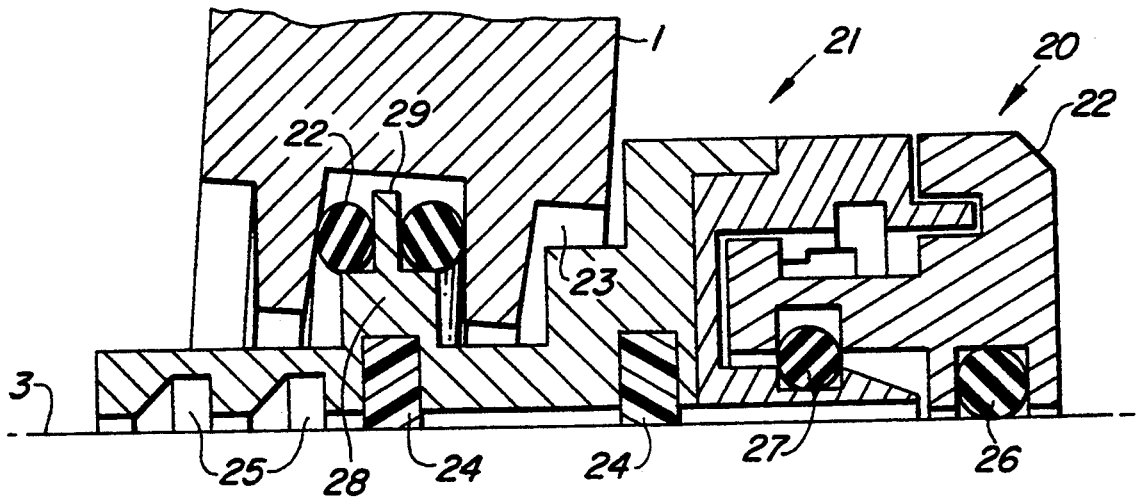
FIG. 4 is a modified view of FIG. 3, however, showing a misalignment between the housing and the carrier and/or seal.

The seal 20 and carrier 21 are axially fixed with respect to the shaft 3 by the projections 28 and 29 entering into the recess 30 of housing 1. The resilient O-rings 22 prevent axial movement of the carrier and/or seal device 21 and 20. The resilience of the O-rings 22 permit the shaft 3 to be rotated about the center point of the bearing 9 and thereby facilitate conformance of the seal and carrier 20 and 21 to the center line of the shaft 3 in a misaligned attitude to the housing. This rotation is shown in FIG. 4. The housing 1 is automatically self-aligned to the carrier and/or sealing device 21 and 20 and shaft 3, which are also all aligned with each other in a fixed manner.

This permanent self-alignment of the bearing, sealing device and shaft to the housing permits the operation of the shaft with an absolute minimum of heat generation or wear of the pillow block. The pillow block housing and shaft can now be easily aligned with other elements of the system to permit the system to run true.

Variations and other aspects of the preferred embodiment will occur to those versed in the art all without departure from the spirit and scope of the invention.

What is claimed:

1. An alignment device for aligning a housing and a seal to a shaft in a split self-contained bearing housing unit where the housing unit includes means for securing together the split housing members comprising:

a shaft generally supported by bearings in split housing units, each of said split housing units having at least one radial groove therein;

a rigid circular member surrounding said shaft;

at least two alignment elements axially displaced and positioned radially on said circular member and firmly abutting said shaft;

at least one outwardly radial projection on said circular member having a predetermined axial width less than the width of the groove in said housing and a radial length less than the depth of said groove in said housing, said projection fitted in said groove in said housing;

a plurality of resilient members affixed to said radial projection and frictionally fitted to the sides of said groove; said resilient members permitting axial and radial rotational movement of said housing units relative to the axial and radial center point of said bearings, thereby facilitating misalignment of the housing to the center line of the shaft and bearing.

2. An alignment device, according to claim 1, wherein said alignment elements are made of a material having low co-efficient of friction.

3. An alignment device, according to claim 2, wherein said alignment elements are made to conform to the surface of said shaft when said shaft is rotated.

4. An alignment device, according to claim 3, wherein said alignment elements conform to the surface of said shaft by being worn away by the rotation of said shaft.

5. An alignment device, according to claim 3, wherein said alignment elements sublimate upon rotation of said shaft.

6. An alignment device, according to claim 3, wherein said alignment elements are made of Teflon ®.

7. An alignment device, as in claim 1, wherein said radial projection has a first and second radial portion; said second portion axially narrower and extending radially further from said shaft than said first portion.

8. An alignment device, according to claim 7, wherein said resilient members are radially fixed on said first portion of said projection and axially restrained on said second portion of said projection.

9. An alignment device, according to claim 1, and having a sealing device permanently affixed to said circular member.

10. An alignment and sealing device for aligning and sealing a shaft in a split self-contained bearing housing unit including means for securing together the split housing members;
  bearing means in said housing unit;
  a shaft generally supported by said bearing means in said housing unit, wherein each of said split housing members has at least one opposing radial groove therein;
  said alignment and sealing device comprising:
    a rigid circular member surrounding said shaft;
    at least two alignment elements axially displaced and radially positioned inwardly on said circular member and firmly abutting said shaft;
    at least one outwardly radial projection on said circular member having a predetermined axial length less than the groove in said housing and having a radial length less than the depth of said groove in said housing, said projection fitted in said groove;
    said circular member having sealing means attached thereto and, radially surrounding shaft;
    a plurality of resilient means fixed to said projection and having a frictional fit with the sides of said groove, said resilient means permitting axial and radial rotational movement of said housing unit relative to the axial and radial center point of said bearings when said housing units are secured together, thereby facilitating misalignment of the housing to the center line of the shaft and bearing.

* * * * *